(12) United States Patent
Dauner et al.

(10) Patent No.: US 6,714,844 B1
(45) Date of Patent: Mar. 30, 2004

(54) VEHICLE COMMUNICATION SYSTEM WITH DISPLAY/CONTROL UNIT

(75) Inventors: Oskar Dauner, Le Perray en Yvelines (FR); Robert Forster, Wörth (DE); Konrad Höb, Parsberg (DE); Alfred Jansche, Waldetzenberg (DE); Sandra Schneider, Stuttgart (DE)

(73) Assignees: DaimlerChrysler AG, Stuttgart (DE); Siemens AG, Munich (DE)

( * ) Notice: Subject to any disclaimer, the term of this patent is extended or adjusted under 35 U.S.C. 154(b) by 0 days.

(21) Appl. No.: 10/018,894
(22) PCT Filed: May 10, 2000
(86) PCT No.: PCT/EP00/04154
§ 371 (c)(1), (2), (4) Date: May 21, 2002
(87) PCT Pub. No.: WO01/00452
PCT Pub. Date: Jan. 4, 2001

(30) Foreign Application Priority Data

Jun. 26, 1999 (DE) .......................................... 199 29 330

(51) Int. Cl.[7] .................................................. G05D 1/00
(52) U.S. Cl. ............................... 701/1; 701/24; 701/33; 442/159
(58) Field of Search ................................ 701/1, 24, 33; 342/159

(56) References Cited

U.S. PATENT DOCUMENTS 5,732,074 A * 3/1998 Spaur et al. ................. 370/313
6,338,011 B1 * 1/2002 Furst et al. ..................... 701/1

FOREIGN PATENT DOCUMENTS

| JP | 19725915 | 1/1999 |
| JP | 19625002 | 2/2000 |
| WO | 98/51991 | 11/1998 |
| WO | 99/06987 | 2/1999 |

OTHER PUBLICATIONS

Neumann, et al. "Ein aufkommender Standard fur verteilte Systeme in Kfz" Kommunikation, Apr. 1998.

Copy of the International Search Report.

* cited by examiner

Primary Examiner—Marthe Y. Marc-Coleman
(74) Attorney, Agent, or Firm—Crowell & Moring L.L.P.

(57) ABSTRACT

A vehicle communication system with display and operator control unit, and having a data bus and components connected thereto, including at least one display/operator control unit and a computing unit which controls the latter. A graphic user interface, which is based on the HTML/XML page format, is implemented in the at least one display/operator control unit and/or the computing unit.

7 Claims, 1 Drawing Sheet

VEHICLE COMMUNICATION SYSTEM WITH DISPLAY/CONTROL UNIT

BACKGROUND AND SUMMARY OF THE INVENTION

This application claims the priority of German Patent Document 199 29 330.9, filed Jun. 26, 1999, the disclosure of which is expressly incorporated by reference herein.

The invention relates to a vehicle communication system.

In modern motor vehicles, in particular cars, it is generally desired to sense and process electronically an increasing number of operator control actions of the user for which previously a large number of different, mechanically activated operator control elements were used, and this electronic sensing and processing is specifically carried out using graphic user interfaces with which the user can actuate all, or at least some of the control units built into the vehicle by means of menu prompting on a screen. The term "graphic user interface" is to be understood here, as is usual, as being not only the mere pictorial representation of screen pages, but it also comprises the corresponding means, implemented using hardware and software, for bringing about all the actions which are associated with it, such as the assignment of functionalities to the individual elements displayed with a screen page and the control of the sequence of the respective functionality when calling/selecting them, i.e. the graphic user interface forms a central component of the interface, composed of hardware and software components, between the system and the user. Such a system configuration is made possible, inter alia, by the increasing networking of the control units by means of a data bus, which can, if appropriate, be composed of a plurality of different types of bus parts which are connected to one another and which are customarily in use in vehicles under the abbreviations CAN and MOST, for example. A convenient possible form of user interaction with the electronic vehicle system is also desirable because of the increasing implementation of telematics applications. Depending on the type and number of the different applications which are implemented in a vehicle, one or more display/operator control units are connected to the vehicle data bus as user interfaces of the vehicle system which are controlled by preferably one common computing unit. In addition, the computing unit can communicate via a corresponding communications unit with controller units, or control units for short, of the vehicle, in particular as a superordinate controller. Recently developed system configurations are described, for example, in the German laid-open publication DE 196 25 002 A1 and the periodical article K. J. Neumann et al., Ein aufkommender Standard fuar verteilte Systeme im Kfz, atp 4/98, p. 22.

In conventional modern vehicle communication systems of this type, a graphic user interface which is based on a bitmap representation is often used, which has the advantage of requiring relatively little computing capacity and in which the various interaction elements which are displayed, such as windows and buttons, are permanently stored for the running time of the system at a respectively fixed location. However, when changes occur, this makes it necessary in each case to change the entire bitmap page which is rigidly stored as one unit. Such a user interface is used, for example, in communications management systems (for example PCM) which are marketed by the co-applicant Siemens AG and are installed in series-produced vehicles.

WO 99/06987 A2 describes a management system for a vehicle communication system which permits all the system components of a vehicle to be controlled. The control management is implemented on a display/operator control unit via a graphic user interface. A function which can be used by the graphic user interface permits the user to view information in the form of HTML pages. A central computing unit controls the display/operator control unit and the other system components via a data bus.

German Patent DE 197 25 915 A1 describes a computer-supported diagnostics device for electronically controlled subsystems which are arranged within an overall system, in particular in a vehicle, and which have means for generating WEB pages, for example in HTML or SGML format, which are implemented in the respective subsystems or in a central server. The WEB pages contain the specific data of the overall system and the diagnostics-relevant data of the subsystems. Furthermore, a diagnostics interface is provided for interaction between the subsystems and electronic equipment which is present outside the overall system.

WO 98/51991 A1 describes a vehicle-external diagnostics system which makes available information in formats which are customary for the Internet.

German Patent DE 197 39 357 A1 discloses a vehicle communication system with a data bus in which a terminal module which functions as a data input and data output unit is provided. The module forms a bus node and includes one or more operator control elements for controlling a plurality of functional models which are present in the motor vehicle. Also formed are bus nodes, a screen, a storage unit in which graphic elements which are to be displayed on the screen are stored in a form which can be called, and a processor unit for representing the graphic user interface on the screen, for evaluating the operator control units and for communication with the functional modules. The communication between the terminal module and the functional modules preferably takes place using a protocol-type interface by means of a page description language which can be compared with the HTML standard, and the function modules are to be correspondingly configured with respect thereto.

For this reason, the invention is based on the technical problem of providing a vehicle communication system of the above-mentioned type which makes it possible, with a degree of computing complexity which is acceptable for vehicle applications, to operate the system as conveniently as possible by means of the one or more display/operator control units using a graphic user interface.

The invention overcomes this problem by providing a vehicle communication system which includes a graphic user interface which is based on the HTML/XML page format (HTML: Hyper-Text Markup Language, XML: Extensible Markup Language), standardized formulation which is used for example in the Internet world and which is implemented in the at least one display/operator control unit or in the computing unit which controls it or is implemented distributed between the two units. The use of such a graphic user interface with HTML/XML page format permits changes, for example, of partial contents of a screen page to be made very much more easily than on graphic user interfaces which are based on a bitmap representation because the pages in HTML/XML format are not rigidly stored as an entire unit for the running time of the system, but instead only their components are stored. In addition, it is possible, by using the HTML/XML format, to make the sequence of successive pages variable under program control during the execution of an application, as a function of specifiable conditions. On the other hand, the present system has the advantage that, in contrast to, for example, Windows-based user systems, it does not need a standardized operating system and therefore entails correspondingly less computational complexity.

In one development of the system, a browser, i.e. interpreter, for the HTML/XML pages is implemented in the display/operator control unit and also an MMI (Man-Machine Interface) applications unit is provided for generating corresponding MMI pages in the HTML/XML format, which unit can be located in the computing unit or the display/operator control unit or be implemented distributed between the two units. The browser supports, for example, HTML files, XML files, image files and text files in the display/operator control unit.

In one development of the system, an ActiveX module, which includes display elements and interaction components, is implemented in the display/operator control unit and/or the computing unit. This measure is specifically expedient when the HTML format is used, while XML is so powerful that ActiveX modules can be dispensed with. The integration of ActiveX interaction components into HTML pages which is made possible by using this standardized module permits both local software components and components which are located in other equipment units which are connected to the bus to be used and/or called. It is expedient here to keep important ActiveX display elements and/or ActiveX interaction components in a library which is implemented in the display/operator control unit so that a comparatively rapid reaction to user inputs is possible and it is relatively easy to make software supplements and updates as well as integrate new functions in the controlling computing unit. Furthermore, an MMI interaction control module, via which the ActiveX interaction components can be actuated by means of a central control part of the computing unit, is provided in one embodiment of the system. In a further embodiment of the invention the central control part of the computing unit is also used to actuate one or more controller units which are connected to the data bus via associated communications units.

BRIEF DESCRIPTION OF THE DRAWINGS

An advantageous embodiment of the invention is illustrated in the drawings and will be described below. In said drawings.

DETAILED DESCRIPTION OF THE DRAWINGS

Figure 1:
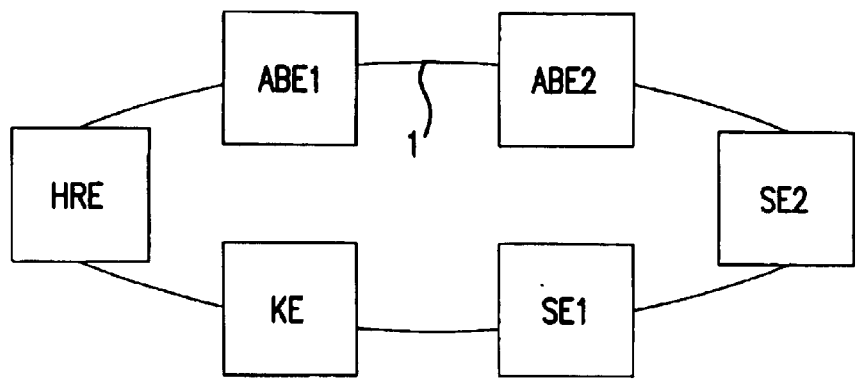
FIG. 1 shows a block diagram of the architecture of a vehicle communication system.

FIG. 1 shows, for the sake of clarity, only one part, which serves to explain the present invention, of a vehicle communication system. As is clear from FIG. 1, this system contains a data bus 1 to which a multiplicity of components networked via the bus 1 are connected. The components include a central computing unit HRE, also referred to below as main computer unit or master computer, two display and operator control units ABE1, ABE2, a communications unit KE and two controller units SE1, SE2, also referred to simply as control units. The main computer unit HRE assumes the system control of the communication system and controls in particular the displays and the interactions on the respective display/operator control unit ABE1, ABE2. The control communication between the main computing unit HRE and the respective control unit SE1, SE2 takes place via the communications unit KE. In addition, the vehicle communication system can contain further components (not shown) as nodes of the data bus 1 or as network nodes of an entire data bus network, of which the data bus 1 shown then forms a network part.

Figure 2:
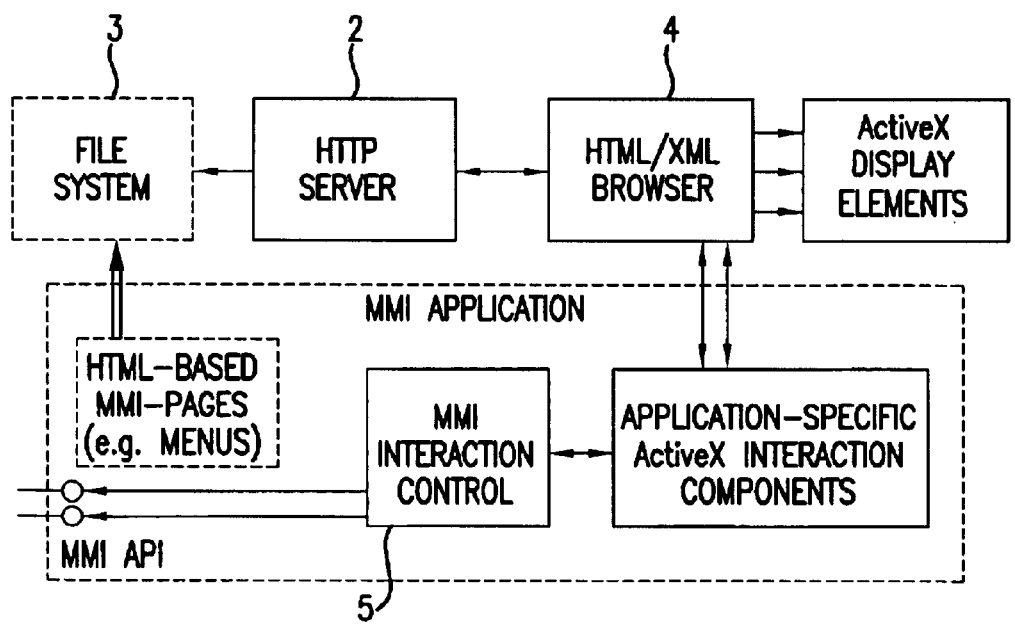
FIG. 2 shows a block diagram of the software module architecture in one of the display/operator control units of the system from FIG. 1.

For the respective display and operator control unit ABE1, ABE2, a graphic user interface which is based on the HTML/XML page format is characteristically implemented, for which interface HTML, XML and ActiveX modules which are standardized as basic elements can be used, in which case the use of ActiveX modules can be dispensed with if XML is selected. FIG. 2 shows a representation of a software architecture in the respective display/operator control unit ABE1, ABE2 which is suitable for this implementation. As is apparent from FIG. 2, the implemented graphic user interface is composed of an MMI applications module 2 in the form of an HTTP server, which generates HTML or XML pages by means of an associated file system 3 and can be implemented in the control computer or in the display/operator control unit or can be implemented distributed in both components, and of an associated browser or interpreter 4 in the display/operator control unit for representing these generated pages. The browser 4 supports, for example, HTML, XML, image and text files. The pages can alternatively also be permanently stored on the server.

The implemented ActiveX module contains ActiveX display elements, for example icons and ActiveX interaction components, for example list handling, in which case the latter can be application-specific. An MMI application which is implemented in the display/operator control unit comprises a part 5 of an MMI interaction control module which regulates the sequences between the ActiveX interaction component and a central control part of the control computer. This module can be composed of two parts, of which one is located locally in the display/operator control unit and the other in the main computing unit. The communication from and to the data bus 1 takes place via an associated MMI-API. The MMI interaction control part which is located in the main computing unit is based on the central controller of the system, which simultaneously operates the communications and control units. HTML-based MMI pages, for example menus, which are prepared by the MMI application are fed to the file system 3.

The communication between the display/operator control unit and the main computing unit HRE takes place via the data bus 1 which for this purpose has a suitable transport layer, for example of the TCP/IP type. The known optical data bus MOST, for example, is suitable as data bus 1.

The system structure described has the following advantages. Display/operator control units of different type can be operated by the control computer HRE without said control computer HRE having to know and take into account the capabilities of the respective display/operator control unit, for example its display quality. The greater the number of display/operator control units which have to be operated by the main computing unit HRE, the greater the benefit of the present system structure here. Changes to an object in the user interface, for example in the design of a pointer arrow, need to be carried out only in the respective display/operator control unit. The MMI application can be described independently of platforms and languages. The integration of new functions in the control computer HRE does not require any change to the display/operator control units if the graphic elements already present there of a library of the ActiveX display elements which is expediently provided for said elements are sufficient, so that simple supplements and updates of the software in the control computer are possible.

As a further advantage, the integration of ActiveX interaction components into HTML pages permits the use or the calling of software components which are present locally, and of components which are located in other equipment units on the bus 1. A comparatively rapid reaction to user inputs is made possible by the fact that the most important ActiveX display elements and ActiveX interaction components are kept in the aforesaid library of the respective display/operator control unit and for this purpose are adapted to the physical conditions of the respective display/operator control unit. The ActiveX objects can be application-dependent and run on the control computer or in a respective display/operator control unit.

What is claimed is:

1. A vehicle communication system comprising:
    a data bus connected with at least one display/operator control unit (ABE1, ABE2) and at least one other system component controlled by a computing unit (HRE),
    a graphic user interface, which is based on a HTML/XML page format, is implemented in at least one of the at least one display/operator control unit (ABE1, ABE2) and the computing unit (HRE) which controls the at least one display/operator control unit and,
    wherein the graphic user interface based on the HTML/XML page format is used for communication between the at least one display/operator control unit and the computing unit, and wherein the communication between the at least one display/operator control unit and the computing unit is based on a central system controller, by means of which the computing unit communicates with the at least one other system component.

2. The vehicle communication system according to claim 1, wherein the graphic user interface comprises an MMI application unit, which generates HTML/XML pages, in the at least one computing unit (HRE) and display/operator control unit (ABE1, ABE2) and a browser for said HTML/XML pages in the display/operator control unit.

3. The vehicle communication system according to claim 2, wherein an ActiveX module is implemented in the at least one display/operator control unit (ABE1, ABE2) and the computing unit (HRE), said ActiveX module comprising ActiveX display elements and ActiveX interaction components.

4. The vehicle communication system according to claim 1, wherein an ActiveX module is implemented in the at least one display/operator control unit (ABE1, ABE2) and the computing unit (HRE), said ActiveX module comprising ActiveX display elements and ActiveX interaction components.

5. The vehicle communication system according to claim 4, wherein an MMI interaction control module is implemented in the at least one display/operator control unit (ABE1, ABE2) and the computing unit (HRE), the ActiveX interaction components being actuated by a central control part of the computing unit via said MMI interaction control module.

6. The vehicle communication system according to claim 5, wherein a central control part of the computing unit (HRE) is also used to actuate one or more communications and/or controller units (KE, SE1, SE2) which are connected to the data bus.

7. A vehicle communication system comprising:
    a data bus connected with at least one display/operator control unit (ABE1, ABE2) and at least one other system component controlled by a computing unit (HRE),
    a graphic user interface, which is based on a HTML/XML page format, is implemented in at least one of the at least one display/operator control unit (ABE1, ABE2) and the computing unit (HRE) which controls the at least one display/operator control unit and,
    wherein the graphic user interface based on the HTML/XML page format is used for communication between the at least one display/operator control unit and the computing unit, and wherein the communication between the at least one display operator control unit and the computing unit is based on a central system controller, by means of which the computing unit communicates with the at least one other system component and wherein an MMI(Man-Machine-Interface) applications unit is provided for generating corresponding MMI pages in the HTML/XML format, which unit is located in one of the computing unit and the display/operator control unit and distributed between the computing unit and the display/operator unit.

* * * * *